ary, or Firm—John E. Callaghan

United States Patent [19]
Albright et al.

[11] 3,930,025
[45] Dec. 30, 1975

[54] PENTACHLOROPHENOL-CREOSOTE WOOD-PRESERVATIVE

[75] Inventors: Denton M. Albright, Penn Hills Township, Allegheny County; Charles Willard Leach, Penn Township, Westmoreland County, both of Pa.

[73] Assignee: United States Steel Corporation, Pittsburgh, Pa.

[22] Filed: July 1, 1971

[21] Appl. No.: 159,012

[52] U.S. Cl. .......................... 424/346; 21/7; 208/2; 424/347

[51] Int. Cl.² ...................... A01N 9/00; A01N 9/26

[58] Field of Search ............ 424/347, 358, 167, 346

[56] References Cited
UNITED STATES PATENTS

| | | | |
|---|---|---|---|
| 3,039,843 | 6/1962 | Chamberlain et al. | 424/167 X |
| 3,390,151 | 6/1968 | Masciantonio et al. | 260/283 R |

*Primary Examiner*—Leonard Schenkman
*Attorney, Agent, or Firm*—John E. Callaghan

[57] ABSTRACT

Tar bases are removed from creosote oil prior to the addition of pentachlorophenol to the creosote oil to obtain a relatively non-corrosive wood preservative formulation.

5 Claims, No Drawings

PENTACHLOROPHENOL-CREOSOTE WOOD-PRESERVATIVE

BACKGROUND OF THE INVENTION

To improve the durability and longevity of preserved wood utility poles in service, utility companies have specified that their purchased poles be treated with creosote that contains about 2 weight percent pentachlorophenol (commonly called creopenta solution). Since 1958 the number of poles treated with the creopenta solution has averaged over a half million annually.

The improved wood preserving properties of creopenta solutions have been evaluated by many workers in the field and evaluation of the results obtained has consistently shown it to have superior wood preserving properties. Although creo-penta solution has been proven to be a superior wood preservative, experience of wood preservers and confirmation by laboratory tests has shown that the creo-penta solution is highly corrosive to carbon steel storage and pressure vessels, piping, and pumps used in the wood treating process. Because of the superior wood preserving properties of creo-penta solution, it is expected that creo-penta solution would be widely used for the preservative treatment of a much larger volume of wood products, including such items as power transmission poles, posts, lumber, land-use piles, and railway cross ties, if the cost of these treated products would not have to include a substantial surcharge to repay the plant costs incurred by excessive corrosion.

Although the corrosivity of pentachlorophenol-creosote formulations has been abundantly documented in the literature, there appears to be very little information describing its actual cost. Various experimental studies have revealed that corrosivity is significantly effected by the operating conditions employed in the wood treating plant, and is greatly accelerated by the use of pressure and high temperature.

In an effort to minimize the corrosivity of creo-penta solution, several experimenters have attempted to add corrosion inhibitors to the creo-penta solutions. For example, in 1960, the availability of a corrosion inhibitor formulation for use in creo-penta solutions was announced. The primary active inhibitor ingredient was orthophosphoric acid. This additive did not prove to be of significant value and is not known to be in use at the present time.

Also in 1960, a series of tests was conducted to evaluate the efficacy of 155 chemical substances that offered some promise as useful corrosion inhibitors and a report was issued by Allied Chemical Corporation (Technical Data Report "Corrosion in the Treating Plant", Industrial Tar Products, Plastics Division, Allied Chemical Corporation, New York). This report demonstrated that no inhibitors or inhibitor system tested would prevent corrosion of carbon steel in the presence of creo-penta solution under prevailing normal plant operating conditions.

In 1961, a series of tests was conducted by other experimenters to evaluate the effectiveness of cathodic protection systems in the creo-penta solutions. No significant improvement in the rate of corrosivity was demonstrated.

All prior efforts have been concerned with controlling the corrosive nature of pentachlorophenol in creosote formulations rather than with the elimination of the cause.

It is an object of this invention to eliminate the cause of corrosion in pentachlorophenol-creosote formulations and to satisfy a long felt need in the industry by providing a simple and inexpensive method of lowering the corrosivity of creo-penta solutions.

SUMMARY OF THE INVENTION

Accordingly, the present invention involves removing tar base impurities from the creosote oil prior to preparation of the pentachlorophenol-creosote formulation. This simple and inexpensive pre-treatment was unexpectedly found to greatly reduce the corrosivity of the pentachlorophenol-creosote formulation to carbon steel. Our process differs from all the preceding attempts to solve the corrosion problem in that it removes the cause of the problem rather than treating the effect.

DETAILED DESCRIPTION

Acid-washing of creosote oil to remove tar bases is not new. Any of the conventional procedures known to the art may be used in the pre-treatment of the creosote oil to be used in our formulation.

The washing may be done with a mineral acid or if the bases removed from the creosote are to be recovered, the procedure of U.S.P. at No. 3,390,151 involving extraction with monopyridinium sulfate may be employed. The bases may also be removed by solid absorbents such as ion exchange resins. One standard method of removing the tar bases is to wash the creosote oil at 50°C with 30% sulfuric acid in an amount equivalent to a 1 to 1 mole ratio of acid to contained tar bases. The washing is continued for 30 minutes after which the mixture is allowed to settle for 20 minutes. After removal of the acid layer the oil is washed with about one-quarter its weight of 14 weight percent sodium carbonate solution. The neutralization wash is continued for twenty minutes after which the mixture is allowed to settle.

It should be understood these conditions may vary widely and that any base removal technique may be employed provided only that the acid-washed creosote contains less than about 7.5 milliequivalents quinoline (meq), preferably less about 2.5 meq/per 100 grams of washed oil.

The washed oil is then combined with the pentachlorophenol in any suitable manner as by pouring the pentachlorophenol into the warm creosote and stirring until the pentachlorophenol dissolves. The creosote is usually held at about 120°F although dissolution is quicker at higher temperatures. The pentachlorophenol is very soluble in creosote so mixing will be fast.

Standard wood-preserving solutions contain about 1 to 6%, preferably about 2%, pentachlorophenol although it should be understood that we do not intend to be limited to these particular solution concentrations.

A standard creo-penta solution (2% pentachlorophenol in creosote oil) prepared according to our process will exhibit a corrosivity only about 15 to 20% of that of conventional creo-penta solutions.

Our invention is further illustrated by the following non-limiting examples.

EXAMPLE 1

Three hundred milliliters of dilute sulfuric acid was prepared by adding 10 ml of 96 percent sulfuric acid to 290 ml distilled water in a large separatory funnel. To the dilute sulfuric acid solution was added 300 ml of a creosote oil meeting the specifications of the American Wood Preservers Association Standard P1-65. Chemical analyses of the specification-grade creosote before acid-washing showed that it contained material classified as tar bases equivalent to 38.6 milliequivalents quinoline (meq) per 100 grams of creosote oil. No effort was made to identify the specific chemical constituents making up this group of tar base material.

The creosote-acid mixture was shaken at frequent intervals during a two-day period to thoroughly mix the oil and water phases. After two-days contact between creosote and acid solution, the acid solution was removed and 300 ml distilled water was added to the acid-washed creosote. The mixture was shaken in a separatory funnel at frequent intervals for one day and then the washed creosote was withdrawn from the separatory funnel. A second and third wash were similarly performed. A sample of the washed creosote was chemically analyzed and showed a tar base content of 1.51 meq/100 grams.

EXAMPLE 2

To test the relative corrosivity of creosote-pentachlorophenol solutions made with regular AWPA-specification-grade creosote and with acid-washed creosote, two solutions were made up as follows:

Solution A
257.7 g acid-washed creosote
5.2 g pentachlorophenol
7.8 g water

Solution B
257.7 g creosote AWPA Standard P1-65
5.2 g pentachlorophenol
7.8 g water The water was added to simulate the streams found in wood preserving plants where the water is present in the wood being treated. About 3% water in the creosote solution is allowed in the industry specification.

Each creosote-pentachlorophenol-water mixture was placed in a 500 ml flask. Two carbon steel coupons, each with a surface area of about 5.43 square inches, were cleaned in an alkali solution, washed with water, acetone, and finally with a hydrochloric acid cleaning solution. Coupon A, to be placed in Solution A, weighed 36.240 g. Coupon B, to be placed in Solution B, weighed 35.8833 g.

Each coupon was suspended on a glass hook and completely immersed in the respective creosote-pentachlorophenol-water mixture in one of the flasks. The steel coupons were allowed to reside in the solutions, with occasional agitation, at ambient room temperature, for a period of 12 weeks and 5 days.

Upon removal of the coupons from their respective creosote-pentachlorophenol-water mixtures, each coupon was thoroughly cleaned by organic solvent and alkali washed. The following weights after the test were determined:

Coupon A – 36.1578 g.
Coupon B – 35.2357 g.

During the nearly 3 months exposure, Coupon A in the acid-washed creosote lost 0.0826 g., or the equivalent of 0.4 mil per year as surface corrosion. During the same period and under the same exposure conditions, Coupon B in the AWPA-specification-grade creosote lost 0.647 g., or the equivalent of 3.0 mils per year as surface corrosion. thus, demonstrating the beneficial effect of our process.

We claim:

1. A creosote-pentachlorophenol wood preservative solution consisting essentially of creosote having a maximum tar base content of 7.5 meq/100 g oil and pentachlorophenol, said phenol being about 1 to about 6 weight percent of said creosote.

2. The solution of claim 1 wherein said creosote has a miximum tar base content of 2.5 meq/100 g oil.

3. The solution of claim 2 wherein said creosote has a tar base content of 1.51 meq/100 g oil.

4. The solution of claim 1 wherein said solution contains about 3 percent by weight of water.

5. The solution of claim 4 wherein said phenol is about 2 percent by weight of said creosote.

* * * * *

UNITED STATES PATENT OFFICE
CERTIFICATE OF CORRECTION

Patent No. 3,930,025　　　　　Dated December 30, 1975

Inventor(s) Denton M. Albright et al.

It is certified that error appears in the above-identified patent and that said Letters Patent are hereby corrected as shown below:

Column 2, line 28, after "U.S.P." delete "at".

Column 4, line 25, "0.647" should read -- 0.6476 --.

Column 4, line 35, claim 2, "miximum" should read -- maximum --.

Signed and Sealed this thirteenth Day of April 1976

[SEAL]

Attest:

RUTH C. MASON  
Attesting Officer

C. MARSHALL DANN  
Commissioner of Patents and Trademarks